(12) United States Patent
Ghosh

(10) Patent No.: US 8,532,107 B1
(45) Date of Patent: Sep. 10, 2013

(54) ACCEPTING PACKETS WITH INCOMPLETE TUNNEL-HEADER INFORMATION ON A TUNNEL INTERFACE

(75) Inventor: Kaushik Ghosh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 793 days.

(21) Appl. No.: 12/544,852

(22) Filed: Aug. 20, 2009

(51) Int. Cl.
*H04L 12/28* (2006.01)

(52) U.S. Cl.
USPC .......................................... 370/392; 700/227

(58) Field of Classification Search
USPC .......................................... 370/392; 709/227
See application file for complete search history.

(56) References Cited

U.S. PATENT DOCUMENTS

| | | | | |
|---|---|---|---|---|
| 6,678,283 B1 * | 1/2004 | Teplitsky | | 370/463 |
| 2004/0093521 A1 * | 5/2004 | Hamadeh et al. | | 713/201 |
| 2006/0143300 A1 * | 6/2006 | See et al. | | 709/227 |
| 2007/0002857 A1 * | 1/2007 | Maher | | 370/389 |
| 2007/0156919 A1 * | 7/2007 | Potti et al. | | 709/238 |
| 2009/0296599 A1 * | 12/2009 | Ayyagari et al. | | 370/253 |
| 2009/0316698 A1 * | 12/2009 | Menten | | 370/392 |

OTHER PUBLICATIONS

Thaler et al., "Automatic IP Multicast Without Explicit Tunnels (AMT)," Network Working Group, Jun. 27, 2008, 39 pp.
Ziemba et al., "Security Considerations for IP Fragment Filtering," Network Working Group RFC 1858, Oct. 1995, 8 pp.

* cited by examiner

*Primary Examiner* — Dang Ton
*Assistant Examiner* — Wei Zhao
(74) *Attorney, Agent, or Firm* — Shumaker & Sieffert, P.A.

(57) ABSTRACT

An egress device of a network tunnel is configured to receive fragmented packets over a tunnel interface when the network tunnel is defined using information that is not present in all of the fragmented packets. For example, an egress device includes an interface to receive packets associated with the network tunnel, at least some of the packets being fragmented packets that are fragments of tunnel encapsulated packets. Some of the fragmented packets include network layer information associated with a network layer header of an original unfragmented tunnel encapsulated packet and do not include transport layer information associated with a transport layer header of the original unfragmented tunnel encapsulated packet. A forwarding engine of the egress device uses a multi-stage chained lookup to determine whether packets conform to tunnel definitions for the network tunnel that define the network tunnel by specifying both network layer information and transport layer information required for the packets.

27 Claims, 8 Drawing Sheets

| | SRC/DEST PORT PAIR | IP ID | 1ST FRAG. SEEN? | FRAG. IN BUFFER? | BUFFER POINTER(S) | OTHER STATE DATA |
|---|---|---|---|---|---|---|
| 71A | | | | | | |
| 71B | | | | | | |

| UDP SRC/DEST PORT PAIR | IP ID | 1ST FRAG. SEEN? | FRAG. IN BUFFER? | BUFFER POINTER(S) | OTHER STATE DATA |
|---|---|---|---|---|---|
| 48,000/55,000 | 01568 | 0 | 1 | P1, P2 | ... |
| 49,020/54,550 | . | . | . | . | . |
| 60,000/62,320 | 35261 | 1 | 0 | 0 | ... |
| | 35278 | 0 | 1 | P3, P4, P5 | ... |
| ••• | ••• | ••• | ••• | ••• | ••• |
| 51,009/50,000 | 00798 | 0 | 1 | P6 | ... |

FIG. 6

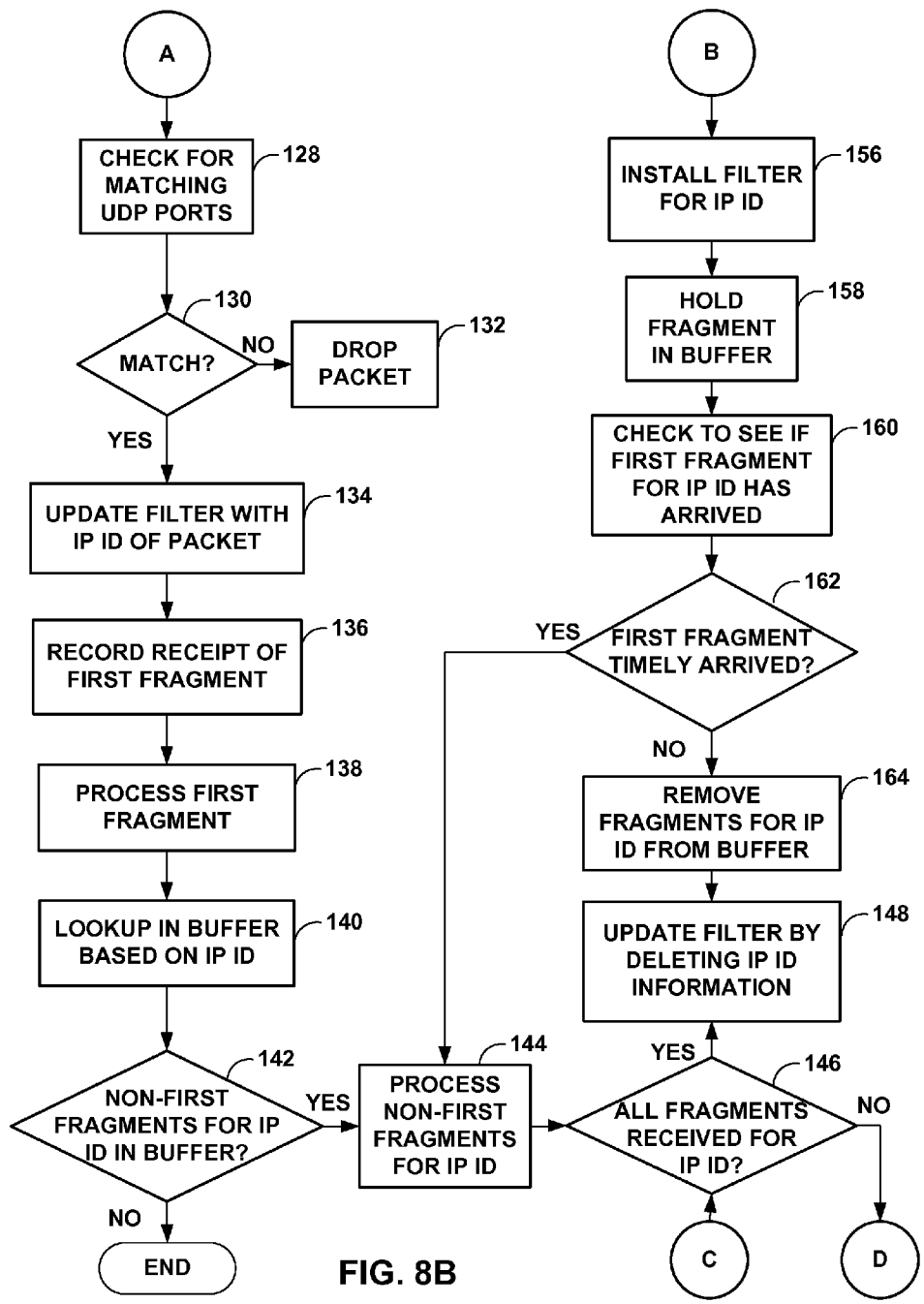

ACCEPTING PACKETS WITH INCOMPLETE TUNNEL-HEADER INFORMATION ON A TUNNEL INTERFACE

TECHNICAL FIELD

This disclosure relates to computer networks, and, more particularly, to network tunnels within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network devices and network links are bounded as to the size of packets or other blocks of data that can be transmitted between two given devices across a given link. This upper-bound is commonly referred to as a "maximum transmission unit" (MTU), also commonly referred to as a "maximum transfer unit." Network devices and network links are required to be capable of supporting a minimum MTU. However, manufacturers are free to support larger MTUs, and many manufacturers frequently do so.

When a network device (e.g., a network router) receives an Internet Protocol (IP) packet to be forwarded within the network, the network device examines a destination address of the IP packet and selects an outgoing interface to use for forwarding the packet. The outgoing interface has an associated MTU that dictates the maximum size for a packet. If the MTU of the outgoing interface is smaller than the packet size and a "don't fragment" (DF) bit of an IP header within the packet is not set, then the network device may fragment the data of the packet so as to form to packet fragments that are separately routable, where each of the packet fragments conform to the MTU requirements of the outgoing interface. That is, the network device segments the data into two or more segments where each segment is less-than-or-equal-to the MTU less the IP header size. Each segment is then put into its own IP packet having an IP header in which a "total length" field is adjusted to the segment size. A "more fragments" (MF) flag is set for all segments except the last segment, which has the MF flag set to 0, and the "fragment offset" field is set accordingly based on the offset of the segment relative to the original data payload.

In some cases, network devices (such as network routers) may use tunnels to connect with remote networks. Example tunneling protocols include the Generic Routing Encapsulation (GRE) and the Point-to-Point Tunneling Protocol (PPTP). User Datagram Protocol (UDP) may also be used for tunneling. Many conventional applications that utilize these tunneling protocols require only information found in the IP header as part of a tunnel decapsulation route. Consequently, an egress network device for the network tunnel (e.g., an egress router) can easily accept fragmented packets and properly associate the fragmented packets with the network tunnel. That is, each fragmented packet includes a complete copy of the IP header, which provides enough information for the egress network device to properly associate individual fragmented packets with the network tunnel and decapsulate the fragmented packets. However, recently some network communications applications have required tunnels to be defined with additional information that is not always present in the IP header. This precludes fragmented packets from being received over such a tunnel, because the information required to decapsulate the fragmented packet is not included on the IP header of fragmented packets and may not be carried by some fragmented packets such as non-first fragments.

SUMMARY

In general, techniques are described for configuring an egress device of a network tunnel (e.g., an egress router) to allow the egress device to receive packets over a tunnel interface even though the network tunnel is defined using information that is not present in all of the packets. That is, the egress network device for the network tunnel can properly associate the packets with a network tunnel and decapsulate the packets even though individual ones of the packets do not necessarily include all of the information required to verify that the packet conform to the network tunnel definition.

For example, recently some network communications applications have required tunnels to be defined with additional information. Specifically, certain applications running on a router may require that tunnel definitions configured on tunnel endpoints (i.e., the ingress and egress of the tunnel) include not only network layer information, such as a IP source address, a destination address IP, and a protocol, but also upper layer information, such as transport layer information (e.g., source and destination ports). One example of such an application is the Automatic Multicast Tunnels (AMT) application. This would normally preclude fragmented packets from being received over such a tunnel interface since the information required to properly associate a packet fragment with such a tunnel in order to decapsulate the tunnel header on the fragmented packet is not necessarily carried by each of fragmented packets such as non-first fragments. In this sense, the tunnel header information of certain packets received on the tunnel (e.g., non-first fragments) is incomplete. The techniques described herein nevertheless allow the egress network device for the network tunnel to properly associate the fragmented packets with the network tunnel and decapsulate the packets. The technique is not confined to IP-fragmentation, but is applicable in any situation where tunnels are formed with encapsulation/decapsulation header fields that aren't available on all packets egressing the tunnel, as long as the protocol provides some way for the end-device to associate all such packets with the tunnel.

As one example, intermediate devices along a network tunnel may fragment received packets when forwarding tunnel encapsulated packets over specific links along the network tunnel. As a result of the techniques described herein, even in such cases where a network tunnel is defined based on transport layer information as well as network layer information, packet fragmentation by intermediate network routers does not adversely affect the egress router's ability to verify that fragmented packets conform to a tunnel interface and decapsulate the fragmented packets. As one example, an intermediate device may fragment the packets to accommodate a path minimum transmission unit (PMTU) of one or more links or devices along the path of the network tunnel. For example, the packets may be Internet Protocol (IP) packets, and the fragmentation may be carried out in accordance with IP version four (IPv4) fragmentation techniques to result in fragmented packets (also referred to as "fragments"). Headers of fragmented packets generally do not carry transport layer information. The transport layer information from the original unfragmented packet may be found in the payload of the first fragment, but the transport layer information will not be present in subsequent non-first fragmented packets.

Tunnel-decapsulation mechanisms that use routes based only on network layer information (e.g., long routes containing <source, destination, protocol> as a prefix for a tunnel) will be unable to accurately determine matching tunnel definitions for decapsulating packets from tunnels that require transport layer information in the tunnel definitions. For example, if there was aliasing of ports in the same long route, the long routes based only on network layer information would not be able to resolve the packet fragments to tunnels. However, an approach that simply added the ports to the long route (e.g., a long route containing <source, destination, source port, destination port, protocol> will not work because the ports information is not present in all fragments (e.g., not present in non-first fragments).

In accordance with on the principles described herein, for tunnel interfaces having tunnel definitions that require both network layer information and higher layer information (e.g., transport layer), the egress router of the network tunnel is specially configured to allow for processing tunnel encapsulated packets received on these tunnel interfaces using the multi-stage chained lookup techniques described herein. An example embodiment is described for performing a multi-stage chained lookup in the forwarding plane of the egress of a network tunnel. In this example, a forwarding plane of the egress router is programmed with long routes that resolve to filters that include information not found in an IP header of packets, as well as information that is found in the IP header of all packets, such as, for example, an identifier of the original unfragmented packet. The multi-stage chained lookup allows an egress router to process encapsulated packets received on tunnel interfaces defined based on both network layer information and higher layer information, and allows the egress router to process these encapsulated packets solely in the forwarding plane.

In this manner, the egress router need not re-assemble the fragments of the tunnel-encapsulated packets in a routing engine or in a service card for purposes of matching encapsulated fragmented packets to tunnel definitions. Processing the encapsulated packets in the forwarding plane may avoid latency and internal fabric bandwidth wastage that may be incurred if a services card was used due to potentially multiple transits through the internal fabric, even when all fragments arrive in order. In addition, the techniques do not require reassembly of the fragmented packets into a full packet for purposes of matching encapsulated fragmented packets to tunnel definitions. This may allow the egress router to begin routing the fragments right after the first fragments arrive, even without requiring full reassembly of the original packet from the fragments. Processing the encapsulated packets solely in a forwarding plane of the egress router without reassembly and using fast update filters may allow router to process received traffic more rapidly and efficiently.

Moreover, although the techniques are described herein for purposes of example with respect to IP fragmentation, the techniques are applicable to other uses besides the IP fragmentation context, such as any situation where different sessions exist between the same pair of hosts or router IP endpoints. For example, the techniques of the invention are applicable in situations where tunnel definitions are defined based on upper layer field information, and where there are also application rules that provide a way to disambiguate packets that belong to the same "session." That is, when there are many tunnels that share the same network layer, but have distinct higher-layer disambiguation points (e.g., different UDP ports) in the tunnel definition, the techniques may be applied. Because the techniques described herein use an IP-header lookup followed by a second stage that keeps track of the UDP ports pair (e.g., a 72-bit long route), it follows that if there are many tunnels with distinct UDP port pairs, but sharing the same IP-endpoints, these tunnels can all use the same long route. This may provide a reduction of FIB state, which can be advantageous because FIB state may be expensive to maintain.

In one embodiment, a method includes receiving a plurality of packets on a network tunnel of a network device for which the network device is configured as an egress of the network tunnel, wherein at least some of the plurality of packets on the network tunnel comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet. The method includes determining, in a forwarding plane of the network device, whether each of the packets conforms to tunnel definitions for the network tunnel, wherein the tunnel definitions define the network tunnel by specifying both network layer information and transport layer information required for the packets, and processing the packets according to the determination.

In another embodiment, an egress device of a network tunnel includes a physical interface configured to receive a plurality of packets associated with the network tunnel, wherein at least some of the plurality of packets comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet. The egress router also includes a forwarding engine configured to determine whether each of the packets conforms to tunnel definitions for the network tunnel, wherein the tunnel definitions define the network tunnel by specifying both network layer information and transport layer information required for the packets, and process the packets according to the determination.

In another embodiment, a computer-readable storage medium is programmed with instructions. The instructions cause a programmable processor to receive a plurality of packets on a network tunnel of a network device for which the network device is configured as an egress of the network tunnel, wherein at least some of the plurality of packets comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet. The instructions also cause the programmable processor to determine, in a forwarding plane of the network device, whether each of the packets conforms to tunnel definitions for the network tunnel, wherein the tunnel definitions define the network tunnel by specifying both network layer information and transport layer information required for the packets, and process the packets according to the determination.

In another embodiment, a system includes an ingress device of a network tunnel configured to send a plurality of encapsulated packets into the network tunnel, an egress device of the network tunnel configured to receive the plurality of tunnel encapsulated packets on the network tunnel, and one or more intermediate network devices positioned along the network tunnel between the ingress device and the egress device. At least one of the intermediate network devices is configured to fragment at least some of the plurality of tunnel encapsulated packets and forward the fragmented tunnel encapsulated packets along the network tunnel. The egress device includes a physical interface configured to receive the plurality of tunnel encapsulated packets associated with the network tunnel, wherein at least some of the plurality of tunnel encapsulated packets comprise fragmented packets that are fragments of encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet. The egress device also includes a forwarding engine configured to determine whether each of the packets conforms to tunnel definitions for the network tunnel, wherein the tunnel definitions define the network tunnel by specifying both network layer information and transport layer information required for the packets, and process the packets according to the determination.

In a further embodiment, a method includes receiving a plurality of packets on a network tunnel of a network device for which the network device is configured as an egress of the network tunnel, wherein at least some of the plurality of packets on the network tunnel comprise fragmented packets that are fragments of tunnel encapsulated packets, wherein at least some of the fragmented packets include network layer information associated with a network layer header of an original unfragmented tunnel encapsulated packet and do not include higher layer information associated with a higher layer header of the original unfragmented tunnel encapsulated packet. The method also includes determining, in a forwarding plane of the network device, whether each of the packets conforms to tunnel definitions for the network tunnel, wherein the tunnel definitions define the network tunnel by specifying both network layer information and higher layer information required for the packets, and processing the packets according to the determination.

In a further embodiment, a method includes receiving a plurality of packets on a network tunnel of a network device for which the network device is configured as an egress of the network tunnel, wherein at least some of the packets include network layer information associated with a network layer header and do not include higher layer information associated with a higher layer header, wherein at least some of the packets are associated with different sessions between the network device and an ingress network device. The method also includes determining, in a forwarding plane of the network device, whether each of the packets conforms to tunnel definitions for the network tunnel, wherein the tunnel definitions define the network tunnel by specifying both network layer information and higher layer information required for the packets to differentiate packets associated with the different sessions, and processing the packets according to the determination.

In another embodiment, a method includes establishing a network tunnel having endpoint devices, and after establishing the network tunnel, negotiating Uniform Datagram Protocol (UDP) source port and UDP destination port pairs for one or more different sessions associated with the network tunnel. The method also includes installing to a forwarding plane data structure of a network device a long route that identifies the endpoint devices of the established network tunnel, wherein the long route resolves to a node of the forwarding plane data structure, and wherein the node comprises a pointer to a set of filters associated with one of the endpoint devices, wherein each of the filters of the set of filters is associated with one of the one or more different sessions, and wherein each of the filters indicates the respective negotiated UDP source port and UDP destination port pairs.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is a block diagram illustrating an example set of filters populated with example data.

FIGS. 8A-8B are flowcharts illustrating another example mode of operation of a router.

DETAILED DESCRIPTION

Figure 1:
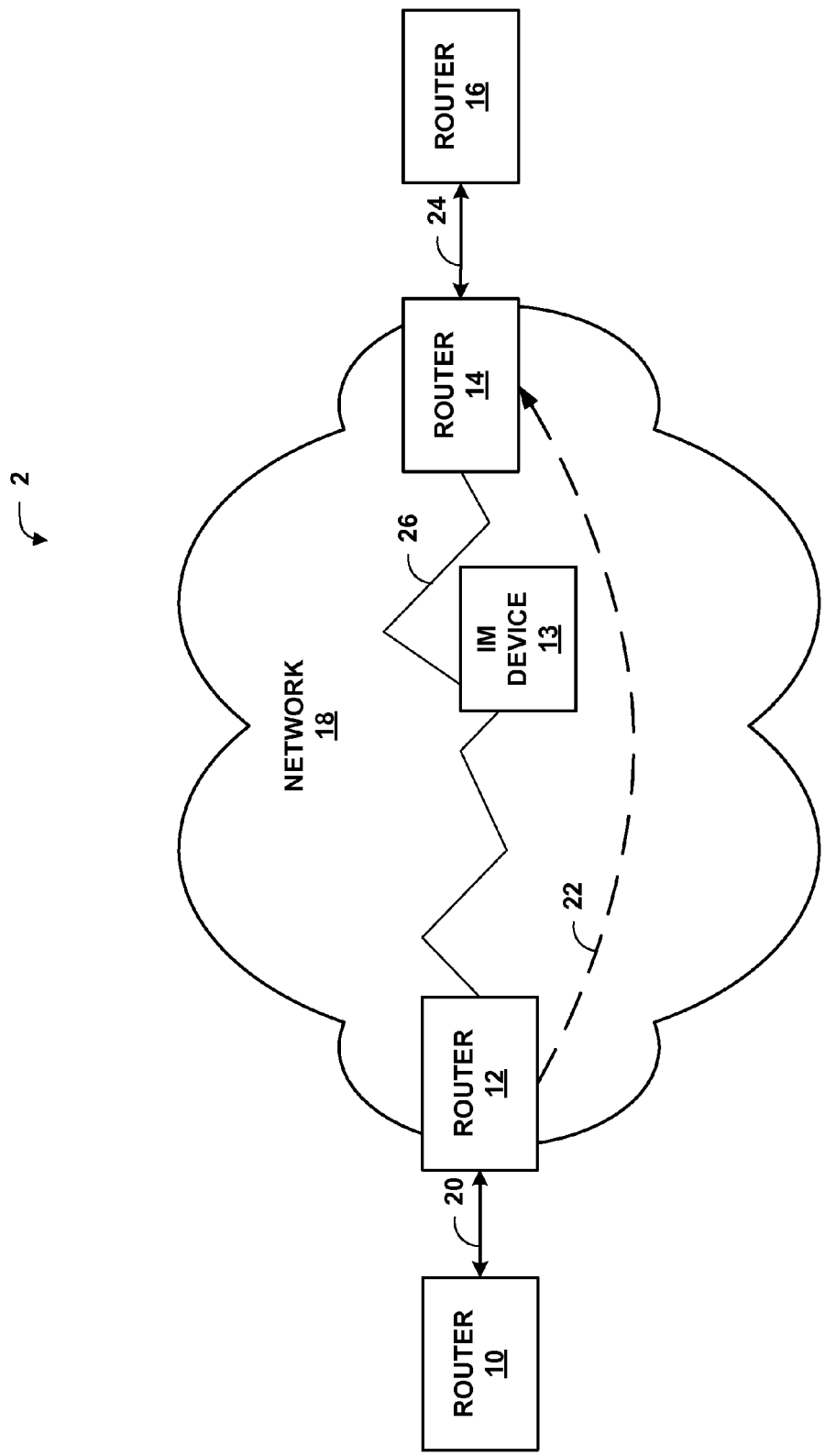
FIG. 1 is a block diagram illustrating an example system having a network tunnel configured between routers of a network.

FIG. 1 is a block diagram illustrating an example system 2 having a network tunnel 22 configured between a router 12 and a router 14 of network 18. Although tunnel 22 may be bi-directional, for purposes of example the disclosure addresses handling traffic for which router 12 acts as the ingress of the network tunnel 22, and router 14 acts as an egress of the network tunnel 22. Tunnel encapsulated packets transmitted over network tunnel 22 may actually follow a path 26 that traverses one or more intermediate hops, e.g., intermediate device 13 ("IM DEVICE 13").

In the example of FIG. 1, router 10 is coupled to router 12 via network link 20. Router 14 is coupled to router 16 via network link 24. Any of links 20, 24 may comprise wireless or wired links, such as Ethernet links, Gigabit Ethernet links, wireless 802.11 links, satellite links, cable links, digital subscriber line (DSL) links, copper PHY links, fiber optic links, or other suitable physical or wireless transmission media.

As one example, router 10 may be associated with customer networks or customer devices that send packets comprising requests for content from router 16. Router 10 sends the packets to router 12, which encapsulates the packets for transmittal over network tunnel 22. This process is referred to as "tunnel encapsulation." Example tunneling protocols include the Generic Routing Encapsulation (GRE) and the Point-to-Point Tunneling Protocol (PPTP). User Datagram Protocol (UDP) may also be used for tunneling.

As the egress of network tunnel 22, router 14 accepts encapsulated packets on a tunnel interface associated with network tunnel 22, and determines how to handle the encapsulated packets based on tunnel definitions configured on router 14. For example, router 14 executes the tunneling protocols to establish network tunnels, such as network tunnel 22. When operating as an egress for a network tunnel, router 14 creates a tunnel interface, which is a logical construct that specifies a tunnel definition to which incoming packets must conform so as to be associated with the network tunnel. Router 14 may match the inbound encapsulated packets to a particular tunnel in accordance with the tunnel definitions based on information found in a header of the encapsulated packets. Upon matching received packets to a tunnel definition, router 14 decapsulates the encapsulated packets and processes the decapsulated packets as indicated by the tunnel definitions. For example, router 14 receives the encapsulated packets from router 12 comprising the requests from the customer networks, and may do a lookup on the inner decapsulated packet to determine a corresponding action to apply, such as to forward decapsulated packets to a next hop, e.g., router 16, in accordance with forwarding information maintained by router 14. Router 16 may be associated with a server device that provides the requested content to the customer networks.

Router 14 may, in some cases, determine that the encapsulated packets received on the tunnel interface associated with network tunnel 22 do not match the tunnel definitions for the tunnel interface on which the encapsulated packets were received. These packets may be irrelevant or due to a denial-of-service (DoS) attack that attempts to prevent router 14 from functioning efficiently or at all. In these cases, router 14 may perform an action, such as to log and/or drop the packets.

Certain applications running within network 2 may require that tunnel definitions configured on tunnel endpoints (e.g., routers 12 and 14) include not only network layer information, such as a source address, a destination address, and a protocol, but also transport layer information, such as source and destination ports. One example of such an application is the Automatic Multicast Tunnels (AMT) application. This would normally preclude fragmented packets from being received over such a tunnel interface, because the information required to properly associate a packet fragment with such a tunnel in order to decapsulate the fragmented packet is not necessarily carried by each of fragmented packets such as non-first fragments. In addition, different fragments of the same packet may be routed differently, and may arrive out of order at the tunnel decapsulation device, e.g., router 14. Thus, a non-first fragment for a packet may be received before a first fragment for the packet. Router 14 is configured in accordance with the techniques described herein, which nevertheless allow router 14, as the egress network device for the network tunnel, to properly associate the fragmented packets with the network tunnel and decapsulate the packets.

As a result, one or more intermediate devices along network tunnel 22 from router 12 to router 14, e.g., IM device 13, may be allowed to fragment encapsulated packets to accommodate a path minimum transmission unit (PMTU) of one or more links or devices along path 26. For example, the encapsulated packets may be Internet Protocol (IP) packets, and the fragmentation may be carried out in accordance with IP version four (IPv4) fragmentation techniques to result in fragmented packets (also referred to as "fragments"), in particular, fragmented encapsulated packets. In such a case, headers of fragmented packets generally do not carry transport layer information, e.g., UDP ports required by the tunnel definition. As a result, for tunnel interfaces having tunnel definitions that require both network layer information and transport layer information, router 14 is specially configured in accordance with the techniques of this disclosure to allow for processing fragmented encapsulated packets received on these tunnel interfaces.

In accordance with on the principles described herein, for tunnel interfaces having tunnel definitions that require both network layer information and transport layer information, egress router 14 of network tunnel 22 is specially configured to allow for processing fragmented encapsulated packets received on these tunnel interfaces using a multi-stage chained lookup. For example, one example embodiment is described for performing a multi-stage chained lookup in the forwarding plane of the egress router 14. In this example, a forwarding plane of egress router 14 is programmed with long routes that resolve to filters that include information not found in an IP header of all fragmented packets, as well as information that is found in the IP header of all fragmented packets, such as an identifier of the original unfragmented encapsulated packet. The multi-stage chained lookup allows egress router 14 to process fragmented encapsulated packets received on tunnel interfaces defined based on both network layer information and transport layer information, and allows the egress router to process these fragmented encapsulated packets solely in the forwarding plane.

In this manner, egress router 14 need not process fragmented encapsulated packets in a routing engine or in a service card for purposes of matching fragmented encapsulated packets to tunnel definitions. Processing the fragmented encapsulated packets in the forwarding plane may avoid latency and internal fabric bandwidth wastage that may be incurred if a services card was used due to potentially multiple transits through the internal fabric, even when all fragments arrive in order. In addition, the techniques do not require reassembly of the fragmented packets into a full packet for purposes of matching fragmented encapsulated packets to tunnel definitions. Processing the encapsulated packets solely in a forwarding plane of the egress router without reassembly and using fast update filters may allow router to process received traffic more rapidly and efficiently.

Although IP-fragmentation in the intermediate cloud is discussed for illustrative purposes, the techniques of this disclosure are applicable to other variants of packet transformation within that cloud which result in modifying the original packet-stream so that the entire tunnel-descriptor information is not present on all packets egressing through the tunnel. Additionally, although two routers are depicted in the example of FIG. 10, the techniques of this disclosure are applicable to any number and any type of intermediate network devices 13 between two endpoint devices, such as router 10 and router 16. Such intermediate devices include, for example, routers, gateways, switches, hubs, bridges, intrusion detection and prevention devices, firewalls, wireless access points, modems, and other such network devices. Moreover, although shown for purposes of example with respect to routers 10, 12, 14, and 16, these devices may comprise other types of network devices, such as routers, gateways, switches, hubs, bridges, intrusion detection and prevention devices, firewalls, wireless access points, modems, and other such network devices.

Figure 2:
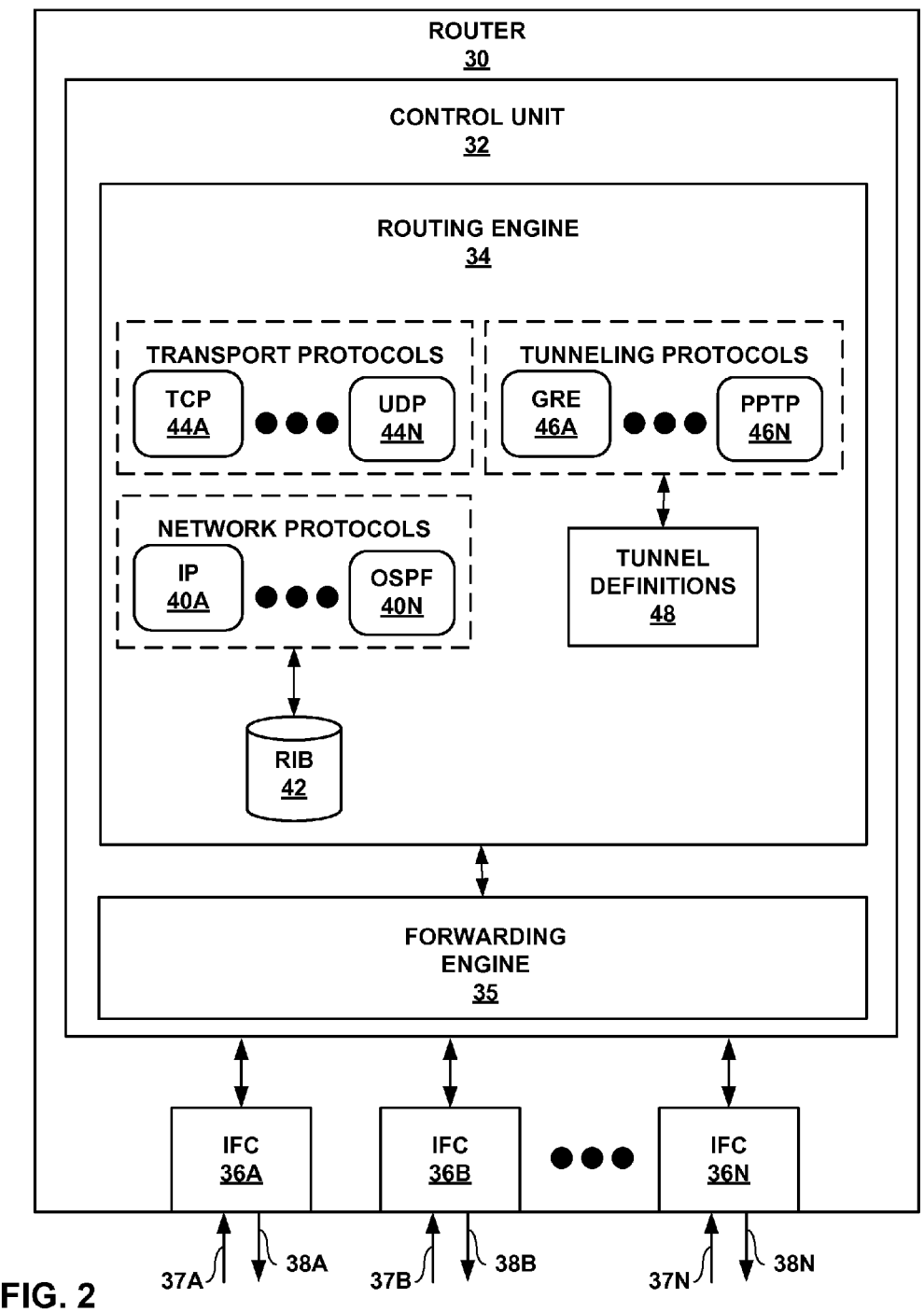
FIG. 2 is a block diagram illustrating an example router configured as an egress router of a network tunnel.

FIG. 2 is a block diagram illustrating an example router 30 configured as an egress router of a network tunnel. For example, router 30 may comprise router 14 of FIG. 1. Router 30 includes a control unit 32 that includes a routing engine 34 coupled to a forwarding engine 35. Router 30 includes interface cards 36A-36N ("IFCs 36") that receive packets via inbound links 37A-37N ("inbound links 37") and send packets via outbound links 38A-38N ("outbound links 38"). IFCs 36 are typically coupled to links 37, 38 via a number of interface ports (not shown). Each of the interface ports may support a maximum transmission unit size. In some examples, the interface ports may each support different MTUs based on the interfaces themselves, links 37, 38 to which the interface ports are connected, and network devices on the other end of these links.

Routing engine 34 provides an operating environment for various protocols that execute at different layers of a network stack. The protocols may be software processes executing on one or more processors. For example, routing engine 34 includes network protocols that operate at a network layer of the network stack. In the example of FIG. 2, network protocols include the Internet Protocol (IP) 40A and the Open Shortest Path First (OSPF) protocol, which is a routing protocol. Routing engine 34 may include other network layer protocols not shown in FIG. 2. Routing engine 34 is responsible for the maintenance of a routing information base (RIB) 42 to reflect the current topology of a network and other network entities to which router 30 is connected. In particular, routing protocols periodically update RIB 42 to accurately reflect the topology of the network and other entities based on routing protocol messages received by router 30.

Routing engine also includes transport protocols that operate at a transport layer of the network stack. In the example of FIG. 2, transport protocols include a Transmission Control Protocol (TCP) 44A and a Uniform Datagram Protocol (UDP) 44N. Routing engine 34 may include other transport layer protocols not shown in FIG. 2. Routing engine also includes tunneling protocols that operate at the transport layer of the network stack. In the example of FIG. 2, tunneling protocols include a Generic Routing Encapsulation (GRE) 46A and the Point-to-Point Tunneling Protocol (PPTP) 46N. Routing engine 34 may include other transport layer protocols not shown in FIG. 2. Router 30 may be configured with tunnel definitions 48 in accordance with one or more of tunneling protocols 46A-46N ("tunneling protocols 46"). Tunnel definitions 48 may define identifiers and parameters for one or more network tunnels associated with router 30. For example, router 30 may be an ingress or an egress of a network tunnel.

Forwarding engine 35 represents hardware and logic functions that provide high-speed forwarding of network traffic. Forwarding engine 35 typically includes a set of one or more forwarding chips programmed with forwarding information that maps network destinations with specific next hops and the corresponding output interface ports. In general, when router 30 receives a packet via one of inbound links 37, forwarding engine 35 identifies an associated next hop for the data packet by traversing the programmed forwarding information based on information within the packet. Forwarding engine 35 forwards the packet on one of outbound links 38 mapped to the corresponding next hop in accordance with the forwarding information. Note that the implementation of forwarding engine 35 could be a set of forwarding engines interconnected through a switching fabric.

In accordance with the techniques of this disclosure, router 30 configures forwarding engine 35 in accordance with tunnel definitions 48. For network tunnels for which router 30 is an egress, routing engine 34 configures forwarding engine 35 based on tunnel definitions 48 with a multi-stage chained lookup that relies on both forwarding information and filters in the forwarding plane. As described in further detail below, routing engine 34 programs forwarding engine 35 with a forwarding information base (FIB) (such as FIB 50 shown in FIG. 3) having long routes based on the source IP address, destination IP address, and protocol associated with a tunnel interface. The long routes in the FIB each resolve to a pointer to a respective set of filters associated with the long route. The filters may be fast update filters (FUFs) that are updated at the time of packet processing, i.e., "on-the-fly." The FUFs may be thought of as filters that allow state to be maintained with them, and have a low overhead of configuration so that they can be added or updated frequently without a burden on the control and/or data planes of the router. The multi-stage chained lookup allows router 30 to process encapsulated packets received on tunnel interfaces defined based on both network layer information and transport layer information, and allows router 30 to process these encapsulated packets solely in the forwarding engine 35. In this manner, router 30 need not process encapsulated packets in routing engine 34 or in a service card (not shown) for purposes of matching fragmented encapsulated packets to tunnel definitions. Processing the encapsulated packets solely in a forwarding plane of router 30 and using fast update filters may allow router 30 to process received traffic more rapidly and efficiently.

In operation, router 30 receives encapsulated packets on a tunnel interface. A tunnel interface may be a logical interface associated with a physical interface port of one of inbound links 37. The encapsulated packets may be fragmented encapsulated packets. The packets are routed within router 30 to the forwarding engine 35, e.g., via switch fabric (not shown). In some embodiments, router 30 may include a plurality of forwarding engines interconnected by the switch fabric. As will be described in further detail below, forwarding engine 35 of router 30 uses a multi-stage chained lookup process for verifying that the encapsulated packets correspond to a tunnel for which router 30 is an egress. The manner in which forwarding engine 35 is programmed in accordance with tunnel definitions 48 and the multi-stage chained lookup process allows packets, including fragmented packets, to be checked against tunnel definitions 48 defined in terms of both network layer information and transport layer information. If forwarding engine 35 determines that an encapsulated packet received by router 30 does not match the tunnel definitions 48, forwarding engine 35 may perform one or more actions on the packet, e.g., logging and/or dropping the packet. If forwarding engine 35 determines that an encapsulated packet does match the tunnel definitions 48, the forwarding engine 35 may decapsulate the packet, inject the packet into a packet forwarding module of the forwarding engine 35, and process the packet. In addition, forwarding engine 35 may determine a next hop to which the packet should be forwarded via a radix tree lookup, a hash, or other mechanism for data plane packet lookup. As another example, forwarding engine 35 may determine that the packet is destined for routing engine 34 of router 30, and may allow the packet to proceed to routing engine 34.

Control unit 32, in one example, comprises hardware for performing one or more of the techniques of this disclosure. In some examples, control unit 32 comprises hardware for executing instructions encoded in computer-readable media. For example, control unit 32 may comprise one or more processors, one or more microprocessors, digital signal processors (DSPs), application specific integrated circuits (ASICs), field programmable gate arrays (FPGAs), or any other equivalent integrated or discrete logic circuitry, or any combination thereof.

Computer-readable media may comprise one or more computer-readable storage media for encoding instructions that cause a processor to perform various procedures or functions. For example, computer-readable media may comprise one or more of a hard disk, an optical medium such as a CD-ROM, a floppy disk, a flash drive, a solid state drive, or other magnetic, optical, or flash medium. Computer-readable media may be encoded with instructions corresponding to various aspects of router 30, e.g., protocols. Control unit 32, in some examples, retrieves and executes the instructions from memory for these aspects.

Figure 3:
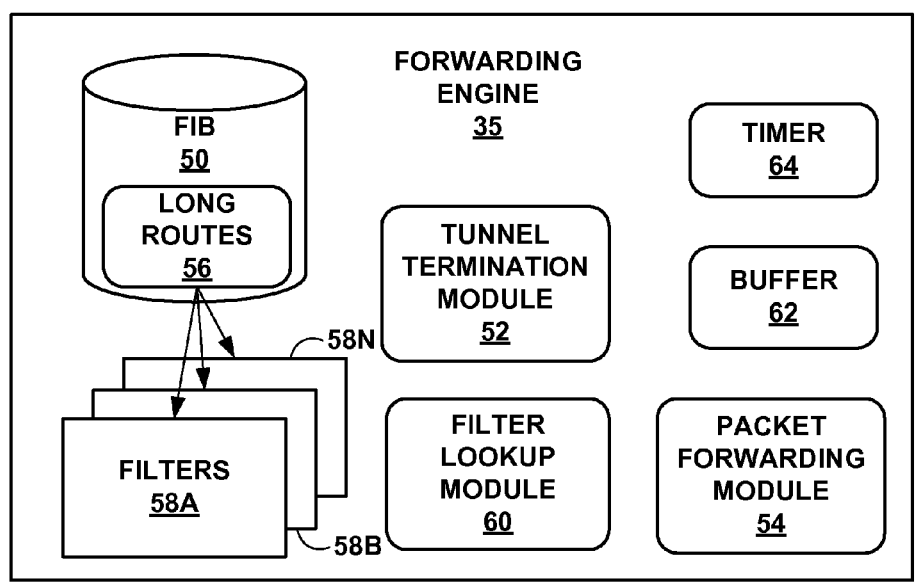
FIG. 3 is a block diagram illustrating an example forwarding engine in further detail.

FIG. 3 is a block diagram illustrating an example forwarding engine 35 in further detail. In the example of FIG. 3, forwarding engine 35 includes forwarding information base (FIB) 50. In accordance with RIB 40 of FIG. 2, forwarding engine 35 maintains FIB 50 that associates network destinations with specific next hops and corresponding interface ports. For example, routing engine 34 analyzes RIB 42 and generates FIB 50 in accordance with RIB 42.

FIB 50 is programmed with long routes 56 that are used by tunnel termination module 52 as one stage for determining whether a received encapsulated packet is associated with a network tunnel for which router 30 is an egress. Long routes 56 may comprise a source network address, a destination network address, and a protocol. For example, with IPv4 GRE tunnels, the long routes 56 may be 72-bit routes ("/72 routes") that include a 32-bit source IP address, a 32-bit destination IP address, and an 8-bit protocol. The combination of source IP address, destination IP address, and protocol, together with the route table in which the long route is installed, may uniquely identify an endpoint device associated with a network tunnel, e.g., an ingress device such as router 12 of FIG. 1. Each of long routes 56 resolves to a node in FIB 50 that includes a pointer to one of filters 58A-58N ("filters 58"). Each of filters 58 comprises a set of filters associated with the endpoint device identified by the corresponding long route. The filters may be fast update filters (FUFs) that are updated at the time of packet processing, i.e., "on-the-fly." The multi-stage chained lookup allows router 30 to process these encapsulated packets solely in the forwarding engine 35. In this manner, router 30 need not process encapsulated packets in routing engine 34 or in a service card (not shown) for purposes of matching fragmented encapsulated packets to tunnel definitions.

Tunnel termination module 52 invokes filter lookup module 60 to perform one or more fast lookups in filters 58 to determine whether the received encapsulated packet matches a network tunnel for which router 30 is the egress. For example, filter lookup module 60 may use a source/destination port pair of the encapsulated packet as a key when doing a lookup in the indicated set of filters 58, e.g., a Uniform Datagram Port (UDP) port pair. Filter lookup module 60 will perform different lookups depending on whether the encapsulated packet is a fragment. When the packet is a fragment, filter lookup module 60 also performs different lookups depending on whether the fragmented encapsulated packet is a first fragment or a non-first fragment. For example, because a non-first fragment typically does not include UDP port information, rather than doing a lookup using the UDP port pair as a key, filter lookup module 60 may do a lookup using the IP ID of the non-first fragment. Filter lookup module 60 does fast lookups, allowing for faster processing of received packets.

In some cases, filter lookup module 60 may store fragments in buffer 62, and may set timer 64. Filter lookup module 60 may use the buffer 62 and timer 64 to deal with non-first fragments received before a corresponding first fragment. Because non-first fragments may not contain the port information that is needed to match to filters 58, the non-first fragments may be held in buffer 62 until the corresponding first fragment is received, or until a timer has expired. The size requirements of buffer 62 may be moderate unless there are a lot of cases of non-first fragments arriving before the first fragment. The operation of filter lookup module 60 relative to filters 58 is described in further detail below with respect to FIGS. 8A-8B.

In addition, due to the multi-stage chained lookup techniques described herein, the routers may allow tunnels to be set up in multiple stages, too. For example, the first stage may involve setting up an "IP endpoint" type tunnel (e.g., an IP-IP or GRE tunnel) over which UDP ports could then be negotiated in a second stage (e.g., to use the ports currently free). In other words, the long route would be shared between the "IP endpoints tunnel" as well as the "IP plus UDP endpoints tunnel."

If an intermediate device along the tunnel, such as IM device 13, is required to do anything special on a per-UDP endpoint basis and IM device 13 is receiving packets that are fragmented, IM device 13 use the multi-stage chained lookup techniques described herein to match received packets with UDP ports. As with the generic (i.e., non-specific to layer-4 information) applicability of the techniques in this disclosure, the intermediate devices may perform special actions based on other fields of the packet.

Figures 4, 5:
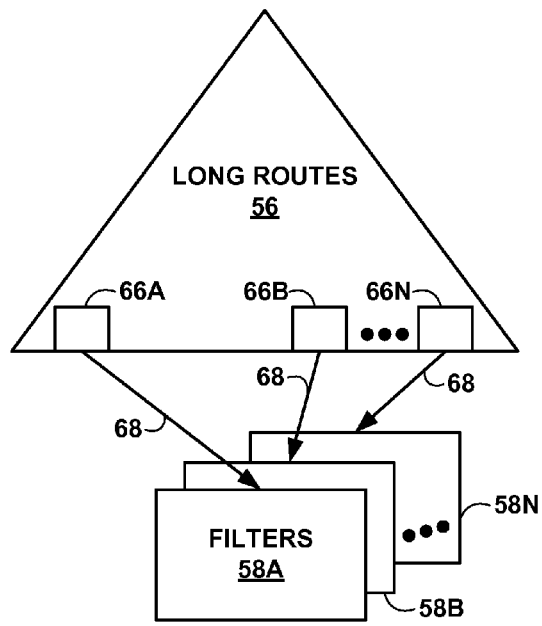
FIG. 4 is a block diagram illustrating example long routes that point to filters.
FIG. 5 is a block diagram illustrating an example set of filters.

FIG. 4 is a block diagram illustrating example long routes 56 and filters 58A-58N. In the example of FIG. 4, long routes 56 is shown as a radix tree data structure having leaf nodes 66A-66N ("leaf nodes 66"). Each of leaf nodes 66 corresponds to a different long route (e.g., a /72 route), and resolves to a pointer 68 to one set of filters 58 that corresponds to that /72 route. Long routes 56 may be programmed by routing engine 34 based on tunnel definitions 48. Although illustrated for purposes of example as a radix tree, long routes 56, as well as filters 58, may be maintained in the form of one or more tables, link lists, radix trees, databases, flat files, or any other data structures.

FIG. 5 is a block diagram illustrating an example set of filters 70. The set of filters 70 may correspond to any of filters 58A-58N, for example. In the example of FIG. 5, set of filters 70 includes a plurality of filters 71A, 71B ("filters 71"). Set of filters 70 include a source/destination ("SRC/DEST") port pair column 72. The source/destination port pair column 72 may be populated by routing engine 34 based on tunnel definitions 48 and RIB 42. Set of filters 70 also include an IP Identifier ("IP ID") column 74. The IP ID column 74 may be populated by filter lookup module 60 upon receiving a fragment to include the IP ID of the received fragment. The IP ID corresponds to the identification field of an IP fragment header that uniquely identifies fragments of an original IP datagram within a given tunnel, since any intermediate entity fragmenting a large packet must put the same IP ID on all the fragments of that packet egressing that entity. Thus, when filter lookup module 60 sees a fragmented encapsulated packet, filter lookup module 60 populates the IP ID column in the row for the appropriate source/destination pair, or may install a new row if the source/destination port pair is not known (e.g., if the packet is a non-first fragment).

Set of filters 70 also include a "first fragment seen?" ("$1^{st}$ FRAG. SEEN?") column 76 that indicates whether a first fragment has been seen corresponding to the IP ID specified in column 74. A "fragments in buffer?" ("FRAG. IN BUFFER?") column 78 indicates whether any fragments are being held in buffer 62 corresponding to the IP ID specified in column 74. Columns 76 and 78 may include respective single bits that may be set to "0" for no and "1" for yes. When column 78 indicates that fragments are being held in buffer 62 for an IP ID, buffer pointer(s) column 80 includes one or more pointers to locations in buffer 62 where the fragments are held. Set of filters 70 may also include other state data 82. For example, other state data 82 may include information as to whether timer 64 has been set, timestamps of received packets, offsets indicated by the received fragments, or any other state data. Columns 74-82 may be populated by filter lookup module 60.

FIG. 6 is a block diagram illustrating an example set of filters 88 populated with example data. Set of filters 88 includes a filter 89A. Filter 89A includes a UDP source/destination pair of 48,000/55,000. Filter 89A indicates that a fragment having an IP ID of "01568" has been seen that matches the UDP source/destination pair of 48,000/55,000. The value of the "first fragment seen?" column is zero, indicating that the first fragment for IP ID 01568 has not yet been seen. The value of the "fragments in buffer?" column is set to one, indicating that there are one or more (non-first) fragments in buffer 62. The buffer pointer(s) column includes two pointers to buffer 62, specifying memory locations P1 and P2.

Filter 89B includes a UDP source/destination pair of 49,020/54,550. Filter 89B indicates that no fragments are recorded as having been received for the UDP source/destination pair of 49,020/54,550. Filter 89C includes a UDP source/destination pair of 60,000/62,320. Filter 89C indicates that fragments are recorded as having been received having IP IDs of 35261 and 35278. In the case of IP ID 35261, the filter indicates that first fragment has been seen, and there are no fragments in buffer 62. In the case of the IP ID 35278, the first fragment has not been seen and fragments are present in buffer 62. The buffer pointer(s) column includes three pointers to buffer 62, specifying memory locations P3, P4, and P5.

Filter 89N indicates an IP ID of 00798 for which the UDP source/destination pair is not known. The first fragment for this IP ID has not been seen, and one or more fragments are present in buffer 62, with a buffer pointer specifying memory location P6 within buffer 62.

Figure 7:
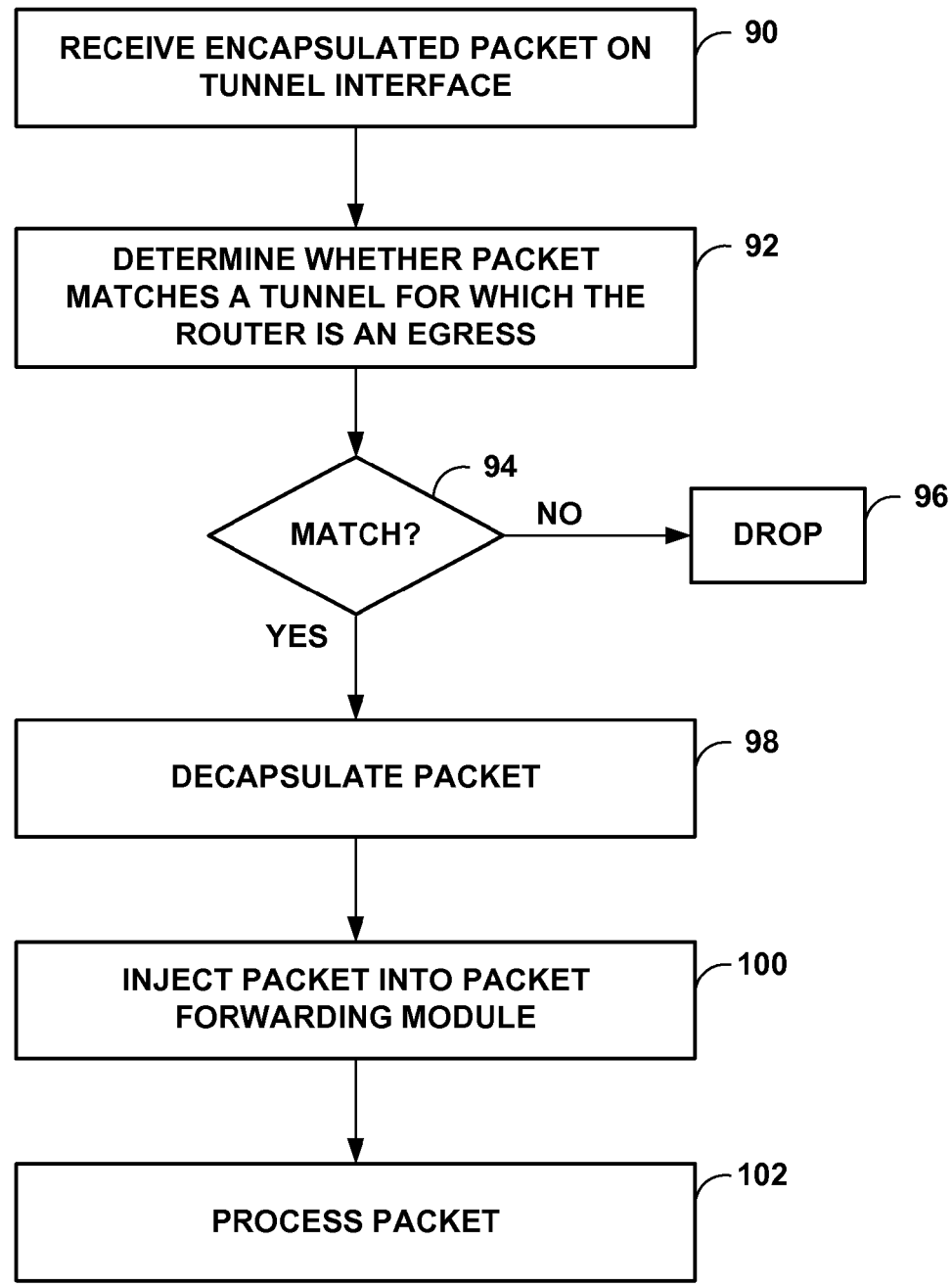
FIG. 7 is a flowchart illustrating an example mode of operation of a router, such as the router of FIG. 2.

FIG. 7 is a flowchart illustrating an example mode of operation of a router, such as router 30 of FIG. 2. Router 30 receives encapsulated packets on a tunnel interface (90). A tunnel interface may be a logical interface associated with an interface port of one of inbound links 37. The packets are routed within router 30 to the forwarding engine 35, e.g., via switch fabric (not shown). As described above, forwarding engine 35 of router 30 uses a multi-stage chained lookup process for verifying that the encapsulated packets correspond to a tunnel for which router 30 is an egress (92). The manner in which forwarding engine 35 is programmed in accordance with tunnel definitions 48 and the multi-stage chained lookup process allows packets, including fragmented encapsulated packets, to be checked against tunnel definitions 48 defined in terms of both network layer information and transport layer information.

If tunnel termination module 52 and filter lookup module 60 of forwarding engine 35 determine that an encapsulated packet received by router 30 does not match definitions for a network tunnel for which router 30 is configured as an egress (NO branch of 94), forwarding engine 35 may be programmed to perform one or more actions on the packet, e.g., logging and/or dropping the packet (96). If forwarding engine 35 determines that an encapsulated packet does match the tunnel definitions 48 (YES branch of 94), the forwarding engine 35 may decapsulate the packet (98), inject the packet into packet forwarding module 54 (100), and process the packet (102). In processing the packet, packet forwarding module 54 may perform a lookup on the decapsulated packet to determine a next hop to which the packet should be forwarded. As another example, packet forwarding module 54 may determine that the packet is destined for routing engine 34 of router 30, and may allow the packet to proceed to routing engine 34.

Figure 8A:
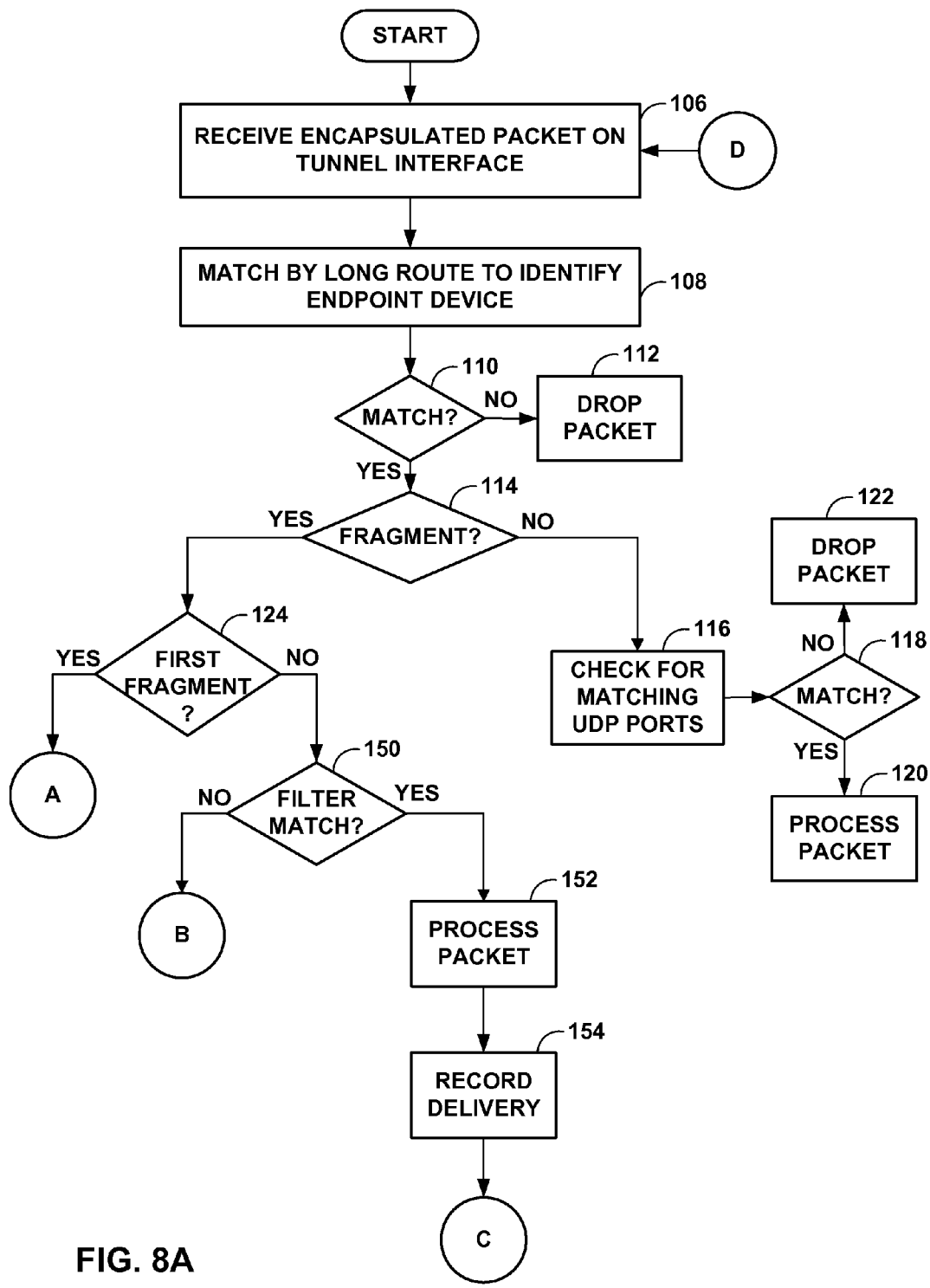

FIGS. 8A-8B are flowcharts illustrating another example mode of operation of router 30 in determining whether an encapsulated packet received by router 30 matches definitions for a network tunnel for which router 30 is configured as an egress. Router 30 receives an encapsulated packet on a tunnel interface (106). The packet is routed within router 30 to the forwarding engine 35, e.g., via switch fabric (not shown). As one example, tunnel termination module 52 accesses long routes 56 of FIB 50 using as a key the /72 route consisting of the source IP address, destination IP address, and protocol as specified in the header of the received packet, to determine whether the /72 route matches any of the long routes 56 in FIB 50 and thereby identify an endpoint with which the encapsulated packet is associated (110). If such a /72 route is not matched by a packet ingressing though the tunnel interface (NO branch of 110), tunnel termination module 52 may perform an action such as dropping the packet (112). If the appropriate /72 route is matched (YES branch of 110), tunnel termination module 52 looks at the pointer 68 of the leaf node 66 to learn which set of filters 58 is specified by the pointer. Tunnel termination module 52 may inform filter lookup module 60 as to which set of filters 58 to use for performing subsequent lookups. As one example, tunnel termination module 52 may inform filter lookup module to use filter 58A.

Filter lookup module 60 determines whether the packet is a fragment (114), e.g., by looking at the header of the packet for some combination of whether an Identification field of the header is set, whether the More Fragments (MF) flag is set, and whether the fragment offset flag is set. When the packet is not a fragment (NO branch of 114), filter lookup module 60 checks the corresponding set of filters 58 (e.g., set of filters 58A) for a match to the UDP source/destination port pair as specified in the UDP ports information of the packet (116). When a match is found in filters 58A (YES branch of 118), filter lookup module 60 allows forwarding engine 35 to process the packet according (120). For example, packet forwarding module 54 may forward the packet to a next hop as specified by the matching filter. When a match is not found in the set of filters 58A (NO branch of 118), filter lookup module 60 allows forwarding engine to drop the packet (122).

When the packet is a fragment (YES branch of 114), filter lookup module 60 determines whether the packet is a first fragment (124). Filter lookup module 60 may make this determination based on whether the More Fragments (MF) flag is set in the packet header, and the fragment offset is zero. When the packet is a first fragment (YES branch of 124), filter lookup module 60 checks the corresponding set of filters 58 (e.g., set of filters 58A) for a match to the UDP source/destination port pair as specified in the UDP ports information of the packet (128 of FIG. 8B). In some embodiments, all of the filters across all tunnels may not have to be exhaustively searched, because the data plane may set up a direct linkage from the long route for the tunnel to the specific filters that are relevant for the pair of source port and destination port for that tunnel. When a matching UDP port pair is not found in the set of filters 58A (NO branch of 130), filter lookup module 60 allows forwarding engine to drop the packet (132). When a matching UDP port pair is found in filters 58A (YES branch of 130), filter lookup module 60 updates the matching filter to include the IP ID of the received fragmented packet (134). Filter lookup module 60 also updates the filter to record the fact that the first fragment has been received for this IP ID (136). Filter lookup module 60 may perform these updates dynamically and "on-the-fly."

Filter lookup module 60 then passes the packet to packet forwarding module 54 for processing (138), e.g., for forwarding to the appropriate next hop. Filter lookup module 60 also looks in buffer 62 to see whether any non-first fragments have been held there for the same IP ID (140). This may occur, for example, when a non-first fragment is received prior to receiving the corresponding first fragment. Because non-first fragments typically do not contain the UDP port information that is needed to match to filters 58, the non-first fragments are held in buffer 62 until the corresponding first fragment is received, or until a timer set by filter lookup module 60 has expired. When no non-first fragments for this IP ID are present in the buffer 62 (NO branch of 142), the process ends for this received fragmented encapsulated packet. When there are non-first fragments present in buffer 62 for this IP ID (YES branch of 142), filter lookup module 60 allows the non-first fragments for this IP ID to be processed (144), and updates the filter to remove the processed non-first fragments.

When filter lookup module 60 determines that all fragments have been processed for this IP ID and no more fragments are expected to be received (YES branch of 146), filter lookup module 60 updates the filter by deleting the IP ID information corresponding to this set of fragments of the original large packet from the filter (148). Filter lookup module 60 may determine that no more fragments are expected to be received based on the MF flags and the fragment offset fields of the received packets, and the lengths of the fragments received, thereby ensuring that all fragments corresponding to the entire large packet have been processed. When filter lookup module 60 determines that not all fragments have been processed for this IP ID (NO branch of 146), the process simply begins again when additional encapsulated packets are received on the tunnel interface (106 of FIG. 8A).

With reference to FIG. 8A, when filter lookup module 60 determines that a received fragmented packet that has matched to one of long routes 56 is not a first fragment (NO branch of 124), filter lookup module 60 does a fast lookup of the indicated set of filters 58 based on the IP ID of the packet (150). A non-first fragment typically does not have UDP port information contained in the payload, and so filter lookup module 60 cannot do a lookup based on UDP port information. If the non-first fragment matches one of the IP IDs specified in the filter 89 for which a first fragment has been received (YES branch of 150), filter lookup module 60 allows packet forwarding engine 35 to process the packet (152) and records delivery of the non-first fragment in state data of the filter 89 (154). There is no problem with IP ID aliasing (e.g., where the tunnel is in a virtual private network (VPN)) even though filter lookup module 60 does not look at the UDP ports for the non-first fragment because, per IP rules, any device performing fragmentation of a large packet cannot have multiple original packets in flight with the same IP ID, and the endpoint with which these fragments are associated has already been determined using the long route match. When filter lookup module 60 determines that all fragments have been processed for this IP ID and no more fragments are expected to be received (YES branch of 146, FIG. 8B), filter lookup module 60 updates the filter by deleting the IP ID information from the filter (148).

If the non-first fragment does not match any of the IP IDs specified in the filters 58 for which a first fragment has been received (NO branch of 150, FIG. 8A), filter lookup module 60 installs a new filter for the IP ID of the current non-first fragment (156), and holds the non-first fragment in buffer 62 (158). The newly installed filter indicates that a fragment is present in the buffer 62 for this IP ID, and includes a pointer to the buffer location. Filter 89N of FIG. 6 illustrates one example of such a filter. A UDP port pair may be configured in the definition of filter 89N, even though no first fragments have yet been received corresponding to filter 89N. The UDP ports pair has not been "matched" yet for this fragment, because that information is present only in the first fragment, which has not yet arrived at the tunnel termination device. The UDP ports pair is a relatively static value, and is set up when the tunnel is established.

Filter lookup module 60 may set timer 64 for the IP ID, and upon expiration of the timer, filter lookup module 60 checks the filter 89 to see whether the first fragment for this IP ID has arrived (160). Alternatively or additionally, filter lookup module 60 may be configured to periodically check the filter 89 at a configured interval. If all the fragments for an IP ID have not arrived within a sufficiently long interval after the arrival of the initial fragment of a flow (NO branch of 162), filter lookup module 60 removes all of the non-first fragments associated with this IP ID from buffer 62 (164) and updates the filter by deleting the IP ID and associated state data (148). This removal and deletion function may aid in protecting router 30 against Denial-of-Service (DoS) or other attacks by an interloper injecting random fragments into the tunnel. When filter lookup module 60 determines that the first fragment for the IP ID has timely arrived (YES branch of 162), filter lookup module 60 processes the non-first fragments held in buffer 62 for that IP ID, and may remove the non-first fragments from the buffer 62 when the non-first fragments are processed. Filter lookup module 60 updates the state data of the appropriate filter 89 to reflect that the first fragment has been received and no fragments are present in buffer 62. The entry of filter 89C corresponding to IP ID 35261 illustrates one example of such state data.

The multi-stage chained lookup allows router 30 to process encapsulated packets received on tunnel interfaces defined based on both network layer information and transport layer information, and allows router 30 to process these encapsulated packets solely in the forwarding engine 35. In this manner, router 30 need not process encapsulated packets in routing engine 34 or in a service card (not shown) for purposes of matching encapsulated fragmented packets to tunnel definitions. Such an approach would be slow, would use up resources outside the data plane, and would require the fragments to be re-injected from either the control plane or the services plane into the data plane, potentially monopolizing internal switch fabric bandwidth of router 30. Processing the encapsulated packets solely in a forwarding plane of router 30 and using fast update filters may allow router 30 to process received traffic more rapidly and efficiently.

In some embodiments, the techniques described above may be modified to address the case in which the first fragment does not contain the UDP ports. However, often router 30 may be configured to drop such packets due to security implications, as detailed in G Ziemba et al., "Security Considerations for IP Fragment Filtering," RFC 1858, October 1995.

Although the techniques have been described for purposes of example with respect to transport layer information comprising UDP port pairs, the techniques may also be applied to other information that may be used for defining a network tunnel, including transport layer information comprising TCP port pairs or other transport layer information, non-network layer information, or other information not found in all fragments.

Although the techniques have been described for purposes of example with respect to network tunnels conforming to IPv4, the techniques may also be applied to network tunnels conforming to IPv6. With IPv6-native tunnels, because the minimum MTU is much larger, the issue of receiving fragmented packets on network tunnels may arise less frequently. Nonetheless, to implement the techniques in the IPv6 context, a "tunnel-setup" control handshake phase may be added between the endpoints, and an IPv6 flow-label may be associated with the tunnel. For example, IPv6 packets have a flow ID field that includes a flow-label. The flow-label may then be used as an alias for the UDP-port pair in the above examples. Where such a flow-label is unavailable between the tunnel endpoints, e.g., where the application using the tunnel needs the IPv6 flow ID field for another purpose, the techniques described above may be used, with forwarding engine 35 performing deeper packet inspection to get to the UDP ports information.

Various embodiments of the invention have been described. These and other embodiments are within the scope of the following claims. For example, while certain embodiments have been described for purposes of example with from the perspective of a router implementing the techniques of the invention, these techniques may be readily applied by any network device that operates as a tunnel endpoint, i.e., an ingress or egress of a network tunnel, e.g., a host device or a network switch. In addition, while the techniques of the invention have been described for purposes of example with respect to tunnel definitions that include transport layer information, the same techniques may be applied for matching fragmented packets to tunnel definitions that include other higher layer information, i.e., information relating to layer four (L4) through layer 7 (L7) of the OSI reference model.

The invention claimed is:

1. A method comprising:
receiving a plurality of packets on a network tunnel of a network device for which the network device is configured as an egress of the network tunnel, wherein at least some of the plurality of packets on the network tunnel comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet;
determining, in a forwarding plane of the network device, whether each of the packets conforms to tunnel definitions for the network tunnel, wherein the tunnel definitions define the network tunnel by specifying both network layer information and transport layer information required for the packets;
for one of the plurality of packets comprising a non-first fragmented packet associated with an original unfragmented tunnel encapsulated packet, performing a lookup in a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices;
determining based on the lookup whether a first fragmented packet associated with the original unfragmented tunnel encapsulated packet has been received having transport layer information that matches a filter of the set of filters; and
processing the non-first fragmented packet in the forwarding plane of the network device after the first fragmented packet associated with the original unfragmented tunnel encapsulated packet is received having transport layer information that matches a filter of the set of filters.

2. The method of claim 1,
wherein each of the nodes comprises a respective pointer to a set of filters associated with one of the endpoint devices.

3. The method of claim 1, wherein the long routes each comprise a source network address, a destination network address, and a protocol, and wherein the transport layer information associated with a transport layer header comprises a Uniform Datagram Protocol (UDP) source port and a UDP destination port.

4. The method of claim 1, further comprising:
when the non-first fragmented packet associated with the original unfragmented tunnel encapsulated packet is received prior to a first fragmented packet associated with the original unfragmented tunnel encapsulated packet, holding the non-first fragmented packet in a buffer within the forwarding plane without processing the non-first fragmented packet.

5. The method of claim 4, further comprising when a first fragmented packet is received having transport layer information that does not match any of the set of filters, dropping the first fragmented packet and any associated non-first fragmented packets held in the buffer.

6. The method of claim 1, further comprising when the one of the plurality of packets comprises the non-first fragmented packet, performing a lookup of the set of filters associated with the endpoint device identified by the lookup in the data structure to determine whether an associated first fragmented packet has been received having transport layer information that matches a filter of the set of filters.

7. The method of claim 6, wherein performing the lookup of the set of filters comprises performing the lookup based on an Internet Protocol identifier (IP ID) field of the non-first fragmented packet.

8. The method of claim 1, further comprising:
receiving a fragmented packet comprising a first fragmented packet of set of fragmented packets associated with an original unfragmented tunnel encapsulated packet;
using transport layer information contained in the first fragmented packet as a key for performing a lookup into the set of filters associated with one of the endpoint devices; and
when the transport layer information matches a filter of the set of filters, processing the first fragment.

9. The method of claim 1,
wherein the network layer information comprises a source address, a destination address, and a protocol, and
wherein the transport layer information comprises a source port and a destination port.

10. The method of claim 1, wherein processing the packets comprises, upon determining in the forwarding plane of the network device that the packets do not conform to tunnel definitions for the network tunnel, dropping the packets.

11. The method of claim 1,
wherein processing the packets comprises:
when the network device determines that the packets conform to tunnel definitions for the network tunnel:
decapsulating the packets; and
processing the decapsulated packets with a packet forwarding component.

12. The method of claim 1, wherein processing the packets comprises processing the packets without requiring reassembly of the fragmented packets into a full unfragmented tunnel encapsulated packet.

13. The method of claim 1, further comprising:
   determining whether all fragments corresponding to an Internet Protocol identifier (IP ID) have arrived within a time interval after receipt of an initial fragment corresponding to the IP ID;
   upon determining that all fragments have not arrived within the time interval:
   removing all of the non-first fragments associated with the IP ID from a buffer, and
   deleting the IP ID and state data from a corresponding filter.

14. An egress device of a network tunnel, comprising:
   a physical interface configured to receive a plurality of packets associated with the network tunnel, wherein at least some of the plurality of packets comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet;
   a forwarding engine configured to determine whether each of the packets conforms to tunnel definitions for the network tunnel, wherein the tunnel definitions define the network tunnel by specifying both network layer information and transport layer information required for the packets; and
   a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices
   wherein the forwarding engine is configured to, for one of the plurality of packets comprising a non-first fragmented packet associated with an original unfragmented tunnel encapsulated packet, perform a lookup in the forwarding plane data structure,
   wherein the forwarding engine is configured to determine based on the lookup whether a first fragmented packet associated with the original unfragmented tunnel encapsulated packet has been received having transport layer information that matches a filter of the set of filters, and
   wherein the forwarding engine is configured to process the non-first fragmented packet in the forwarding plane of the network device after the first fragmented packet associated with the original unfragmented tunnel encapsulated packet is received having transport layer information that matches a filter of the set of filters.

15. The device of claim 14,
   wherein the forwarding plane data structure comprises a forwarding information base (FIB) in the forwarding engine, wherein each of the long routes resolve to a respective node of the FIB,
   wherein each of the nodes of the FIB to which the long routes resolve comprises a respective pointer to a set of filters associated with the endpoint device.

16. The device of claim 14, wherein the long routes each comprise a source network address, a destination network address, and a protocol, and wherein the transport layer information associated with a transport layer header comprises a Uniform Datagram Protocol (UDP) source port and a UDP destination port.

17. The device of claim 14, further comprising:
   a buffer maintained in the forwarding engine, wherein the forwarding engine is configured to hold the non-first fragmented packet associated with the original unfragmented tunnel encapsulated packet in the buffer without processing the non-first fragmented packet when the non-first fragmented packet is received prior to a first fragmented packet associated with the original unfragmented tunnel encapsulated packet.

18. The device of claim 17, further comprising:
   a filter lookup module configured to determine whether all fragments corresponding to an Internet Protocol identifier (IP ID) have arrived within a time interval after receipt of an initial fragment corresponding to the IP ID,
   wherein when the filter lookup module determines that all fragments have not arrived within the time interval, the filter lookup module is configured to remove all of the non-first fragments associated with the IP ID from the buffer, and delete the IP ID and state data from a corresponding filter of the set of filters.

19. The device of claim 17, wherein the forwarding engine is configured to drop the first fragmented packet and any associated non-first fragmented packets held in the buffer when the first fragmented packet is received having transport layer information that does not match any of the set of filters.

20. The device of claim 15, wherein the forwarding engine is configured to perform a lookup of the set of filters identified by the lookup in the FIB, using as a key an Internet Protocol (IP) identifier (ID) field of the non-first fragmented packet, to determine whether an associated first fragmented packet has been received having transport layer information that matches a filter of the set of filters.

21. The device of claim 14,
   wherein when the physical interface receives a fragmented packet comprising a first fragmented packet of set of fragmented packets associated with an original unfragmented tunnel encapsulated packet, the forwarding engine is configured to use transport layer information contained in the first fragmented packet as a key for performing the lookup into the set of filters associated with one of the endpoint devices, and
   wherein when the transport layer information matches a filter of the set of filters, the forwarding engine is configured to process the first fragment.

22. The device of claim 14,
   wherein the network layer information comprises a source address, a destination address, and a protocol, and
   wherein the transport layer information comprises a source port and a destination port.

23. A non-transitory computer-readable storage medium comprising instructions for causing a programmable processor to:
   receive a plurality of packets on a network tunnel of a network device for which the network device is configured as an egress of the network tunnel, wherein at least some of the plurality of packets comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet;
   determine, in a forwarding plane of the network device, whether each of the packets conforms to tunnel definitions for the network tunnel, wherein the tunnel definitions define the network tunnel by specifying both network layer information and transport layer information required for the packets;

for one of the plurality of packets comprising a non-first fragmented packet associated with an original unfragmented tunnel encapsulated packet, perform a lookup in a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices;

determine based on the lookup whether a first fragmented packet associated with the original unfragmented tunnel encapsulated packet has been received having transport layer information that matches a filter of the set of filters; and process the non-first fragmented packet in the forwarding plane of the network device after the first fragmented packet associated with the original unfragmented tunnel encapsulated packet is received having transport layer information that matches a filter of the set of filters.

24. A system comprising:

an ingress device of a network tunnel configured to send a plurality of tunnel encapsulated packets into the network tunnel;

an egress device of the network tunnel configured to receive the plurality of tunnel encapsulated packets on the network tunnel; and one or more intermediate network devices positioned along the network tunnel between the ingress device and the egress device, wherein at least one of the intermediate network devices is configured to fragment at least some of the plurality of tunnel encapsulated packets and forward the fragmented tunnel encapsulated packets along the network tunnel;

wherein the egress device comprises:

a physical interface configured to receive the plurality of tunnel encapsulated packets associated with the network tunnel, wherein at least some of the plurality of tunnel encapsulated packets comprise fragmented packets that are fragments of tunnel encapsulated packets, wherein at least some of the fragmented packets include network layer information associated with a network layer header of an original unfragmented tunnel encapsulated packet and do not include transport layer information associated with a transport layer header of the original unfragmented tunnel encapsulated packet;

a forwarding engine configured to determine whether each of the packets conforms to tunnel definitions for the network tunnel, wherein the tunnel definitions define the network tunnel by specifying both network layer information and transport layer information required for the packets; and a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices wherein the forwarding engine is configured to, for one of the plurality of packets comprising a non-first fragmented packet associated with an original unfragmented tunnel encapsulated packet, perform a lookup in the forwarding plane data structure, wherein the forwarding engine is configured to determine based on the lookup whether a first fragmented packet associated with the original unfragmented tunnel encapsulated packet has been received having transport layer information that matches a filter of the set of filters, and wherein the forwarding engine is configured to process the non-first fragmented packet in the forwarding plane of the network device after the first fragmented packet associated with the original unfragmented tunnel encapsulated packet is received having transport layer information that matches a filter of the set of filters.

25. A method comprising:

receiving a plurality of packets on a network tunnel of a network device for which the network device is configured as an egress of the network tunnel, wherein at least some of the plurality of packets on the network tunnel comprise fragmented packets that are fragments of tunnel encapsulated packets, wherein at least some of the fragmented packets include network layer information associated with a network layer header of an original unfragmented tunnel encapsulated packet and do not include higher layer information associated with a higher layer header of the original unfragmented tunnel encapsulated packet;

determining, in a forwarding plane of the network device, whether each of the packets conforms to tunnel definitions for the network tunnel, wherein the tunnel definitions define the network tunnel by specifying both network layer information and higher layer information required for the packets for one of the plurality of packets comprising a non-first fragmented packet associated with an original unfragmented tunnel encapsulated packet, performing a lookup in a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices;

determining based on the lookup whether a first fragmented packet associated with the original unfragmented tunnel encapsulated packet has been received having higher layer information that matches a filter of the set of filters; and processing the non-first fragmented packet in the forwarding plane of the network device after the first fragmented packet associated with the original unfragmented tunnel encapsulated packet is received having higher layer information that matches a filter of the set of filters.

26. A method comprising:

receiving a plurality of packets on a network tunnel of a network device for which the network device is configured as an egress of the network tunnel, wherein at least some of the packets include network layer information associated with a network layer header and do not include higher layer information associated with a higher layer header, wherein at least some of the packets are associated with different sessions between the network device and an ingress network device;

determining, in a forwarding plane of the network device, whether each of the packets conforms to tunnel definitions for the network tunnel, wherein the tunnel definitions define the network tunnel by specifying both network layer information and higher layer information required for the packets to differentiate packets associated with the different sessions for one of the plurality of packets comprising a non-first fragmented packet associated with an original unfragmented tunnel encapsulated packet, performing a lookup in a forwarding plane data structure comprising one or more long routes programmed based on the tunnel definitions, wherein each of the long routes identifies an endpoint device of the network tunnel, and wherein each of the long routes resolves to a respective node of the data structure, and wherein each of the nodes references a set of filters associated with one of the endpoint devices;

determining based on the lookup whether a first fragmented packet associated with the original unfragmented tunnel encapsulated packet has been received having higher layer information that matches a filter of the set of filters; and processing the non-first fragmented packet in the forwarding plane of the network device after the first fragmented packet associated with the original unfragmented tunnel encapsulated packet is received having higher layer information that matches a filter of the set of filters.

27. The method of claim 26, wherein each of the nodes comprises a respective pointer to a set of filters associated with one of the endpoint devices.

\* \* \* \* \*